United States Patent
Cotton et al.

(10) Patent No.: US 9,537,332 B2
(45) Date of Patent: Jan. 3, 2017

(54) APPARATUS, SYSTEM AND METHOD FOR CHARGE BALANCING OF INDIVIDUAL BATTERIES IN A STRING OF BATTERIES USING BATTERY VOLTAGE AND TEMPERATURE, AND DETECTING AND PREVENTING THERMAL RUNAWAY

(71) Applicant: Canara, Inc., San Rafael, CA (US)

(72) Inventors: Stephen D. Cotton, San Rafael, CA (US); Brian Hanking, Novato, CA (US); Cathy Snetsinger, Fairfax, CA (US); Jason W. Toomey, San Rafael, CA (US); Michael Carmel, Petaluma, CA (US); Tony Yu, San Francisco, CA (US); Patricio A. Triveri, San Francisco, CA (US); Douglas Sheppard, San Francisco, CA (US)

(73) Assignee: Canara, Inc., San Rafael, CA (US)

( * ) Notice: Subject to any disclaimer, the term of this patent is extended or adjusted under 35 U.S.C. 154(b) by 183 days.

(21) Appl. No.: 14/292,538

(22) Filed: May 30, 2014

(65) Prior Publication Data
US 2014/0354237 A1    Dec. 4, 2014

Related U.S. Application Data

(60) Provisional application No. 61/829,170, filed on May 30, 2013, provisional application No. 61/894,253, filed on Oct. 22, 2013.

(51) Int. Cl.
*H02J 7/00* (2006.01)

(52) U.S. Cl.
CPC ............ *H02J 7/0016* (2013.01); *H02J 7/0077* (2013.01); *H02J 7/0088* (2013.01)

(58) Field of Classification Search
USPC ......................................................... 320/134
See application file for complete search history.

(56) References Cited

U.S. PATENT DOCUMENTS

| | | |
|---|---|---|
| 5,047,722 A | 9/1991 | Wurst et al. |
| 5,140,269 A | 8/1992 | Champlin |
| 5,281,920 A | 1/1994 | Wurst |
| 5,469,043 A | 11/1995 | Cherng et al. |
| 5,574,355 A | 11/1996 | McShane et al. |
| 5,583,416 A | 12/1996 | Klang |
| 5,589,757 A | 12/1996 | Klang |
| 5,592,093 A | 1/1997 | Klingbiel |
| 5,656,920 A | 8/1997 | Cherng et al. |
| 5,698,967 A | 12/1997 | Baer et al. |
| 5,705,929 A | 1/1998 | Caravello et al. |
| 5,757,192 A | 5/1998 | McShane et al. |

(Continued)

OTHER PUBLICATIONS

Alber Battery Monitoring Products Brochure, Albercorp, known at least as early as Jan. 1, 2011, 8 pages.

(Continued)

*Primary Examiner* — Mohammed Alam
(74) *Attorney, Agent, or Firm* — Polsinelli PC

(57) ABSTRACT

Implementations of the present disclosure involve a system and method for load balancing a string of jars. The temperature and voltage of each jar is measured and a target voltage for the jar is set based on the measured temperature. A current is supplied to the jar in order to maintain, increase, or decrease the jar's voltage.

19 Claims, 4 Drawing Sheets

(56) References Cited

U.S. PATENT DOCUMENTS

| | | |
|---|---|---|
| 5,821,756 A | 10/1998 | McShane et al. |
| 5,831,435 A | 11/1998 | Troy |
| 5,850,351 A | 12/1998 | Lotfy et al. |
| 5,871,858 A | 2/1999 | Thomsen et al. |
| 5,914,605 A | 6/1999 | Bertness |
| 5,945,829 A | 8/1999 | Bertness |
| 6,031,354 A | 2/2000 | Wiley et al. |
| 6,037,751 A | 3/2000 | Klang |
| 6,051,976 A | 4/2000 | Bertness |
| 6,069,412 A | 5/2000 | Raddi et al. |
| 6,081,098 A | 6/2000 | Bertness et al. |
| 6,104,967 A * | 8/2000 | Hagen ............ G01R 31/3658 429/50 |
| 6,121,756 A | 9/2000 | Johnson et al. |
| 6,160,722 A | 12/2000 | Thommes et al. |
| 6,163,156 A | 12/2000 | Bertness |
| 6,172,505 B1 | 1/2001 | Bertness |
| 6,201,720 B1 | 3/2001 | Tracy et al. |
| 6,218,744 B1 | 4/2001 | Zahrte et al. |
| 6,219,246 B1 | 4/2001 | Edevold et al. |
| 6,225,808 B1 | 5/2001 | Varghese et al. |
| 6,249,124 B1 | 6/2001 | Bertness |
| 6,259,254 B1 | 7/2001 | Klang |
| 6,262,899 B1 | 7/2001 | Raddi et al. |
| 6,266,260 B1 | 7/2001 | Zahrte et al. |
| 6,274,950 B1 | 8/2001 | Gottlieb et al. |
| 6,292,379 B1 | 9/2001 | Edevold et al. |
| 6,295,215 B1 | 9/2001 | Faria et al. |
| 6,295,216 B1 | 9/2001 | Faria et al. |
| 6,304,087 B1 | 10/2001 | Bertness |
| 6,307,763 B1 | 10/2001 | Chavez et al. |
| 6,308,087 B1 | 10/2001 | Aoshima |
| 6,310,783 B1 | 10/2001 | Winch |
| 6,313,608 B1 | 11/2001 | Varghese |
| 6,314,007 B2 | 11/2001 | Johnson et al. |
| 6,316,914 B1 | 11/2001 | Bertness |
| 6,323,650 B1 | 11/2001 | Bertness et al. |
| 6,329,793 B1 | 12/2001 | Bertness et al. |
| 6,330,176 B1 | 12/2001 | Thrap et al. |
| 6,331,762 B1 | 12/2001 | Bertness |
| 6,332,113 B1 | 12/2001 | Bertness |
| 6,348,782 B1 | 2/2002 | Oughton et al. |
| 6,351,102 B1 | 2/2002 | Troy |
| 6,356,284 B1 | 3/2002 | Manduley et al. |
| 6,356,471 B1 | 3/2002 | Fang |
| 6,359,441 B1 | 3/2002 | Bertness |
| 6,363,303 B1 | 3/2002 | Bertness |
| 6,374,460 B1 | 4/2002 | Edevold et al. |
| 6,377,031 B1 | 4/2002 | Karuppana et al. |
| 6,391,489 B1 | 5/2002 | Winch et al. |
| 6,396,170 B1 | 5/2002 | Laufenberg et al. |
| 6,400,586 B2 | 6/2002 | Raddi et al. |
| 6,411,098 B1 | 6/2002 | Laletin |
| 6,418,024 B2 | 7/2002 | Edevold et al. |
| 6,437,957 B1 | 8/2002 | Karuppana et al. |
| 6,441,585 B1 | 8/2002 | Bertness |
| 6,442,494 B1 | 8/2002 | Baalu et al. |
| 6,445,158 B1 | 9/2002 | Bertness et al. |
| 6,456,045 B1 | 9/2002 | Troy et al. |
| 6,462,961 B1 | 10/2002 | Johnson et al. |
| 6,465,908 B1 | 10/2002 | Karuppana et al. |
| 6,466,025 B1 | 10/2002 | Klang |
| 6,469,511 B1 | 10/2002 | Vonderhaar et al. |
| 6,483,730 B2 | 11/2002 | Johnson |
| 6,486,399 B1 | 11/2002 | Armstrong et al. |
| 6,497,209 B1 | 12/2002 | Karuppana et al. |
| 6,507,196 B2 | 1/2003 | Thomsen et al. |
| 6,515,883 B2 | 2/2003 | Wade |
| 6,535,100 B2 | 3/2003 | Forss |
| 6,544,078 B2 | 4/2003 | Palmisano et al. |
| 6,549,440 B2 | 4/2003 | Tassitino et al. |
| 6,566,883 B1 | 5/2003 | Vonderhaar et al. |
| 6,586,941 B2 | 7/2003 | Bertness et al. |
| 6,597,150 B1 | 7/2003 | Bertness et al. |
| 6,599,657 B1 | 7/2003 | Pollett et al. |
| 6,605,879 B2 | 8/2003 | Wade et al. |
| 6,611,774 B1 | 8/2003 | Zaccaria |
| 6,623,314 B1 | 9/2003 | Cox et al. |
| 6,629,247 B1 | 9/2003 | Hall et al. |
| 6,633,165 B2 | 10/2003 | Bertness |
| 6,635,974 B1 | 10/2003 | Karuppana et al. |
| 6,654,355 B1 | 11/2003 | Marbach et al. |
| 6,661,678 B2 | 12/2003 | Raddi et al. |
| 6,696,819 B2 | 2/2004 | Bertness |
| 6,724,596 B2 | 4/2004 | Wade |
| 6,744,149 B1 | 6/2004 | Karuppana et al. |
| 6,753,622 B2 | 6/2004 | Oughton |
| 6,759,849 B2 | 7/2004 | Bertness et al. |
| 6,781,382 B2 | 8/2004 | Johnson |
| 6,788,025 B2 | 9/2004 | Bertness et al. |
| 6,795,782 B2 | 9/2004 | Bertness et al. |
| 6,805,090 B2 | 10/2004 | Bertness et al. |
| 6,819,576 B2 | 11/2004 | Johnson |
| 6,833,760 B1 | 12/2004 | Aude |
| 6,850,037 B2 | 2/2005 | Bertness |
| 6,871,151 B2 | 3/2005 | Bertness |
| 6,885,195 B2 | 4/2005 | Bertness |
| 6,885,307 B2 | 4/2005 | Lockhart et al. |
| 6,888,468 B2 | 5/2005 | Bertness |
| 6,891,378 B2 | 5/2005 | Bertness et al. |
| 6,897,724 B2 | 5/2005 | Gurvich et al. |
| 6,906,522 B2 | 6/2005 | Bertness et al. |
| 6,906,523 B2 | 6/2005 | Bertness et al. |
| 6,906,933 B2 | 6/2005 | Taimela |
| 6,913,483 B2 | 7/2005 | Restaino et al. |
| 6,914,412 B2 | 7/2005 | Wang et al. |
| 6,914,413 B2 | 7/2005 | Bertness et al. |
| 6,919,725 B2 | 7/2005 | Bertness et al. |
| 6,924,622 B1 | 8/2005 | Anbuky et al. |
| 6,930,485 B2 | 8/2005 | Bertness et al. |
| 6,941,234 B2 | 9/2005 | Bertness et al. |
| 6,967,484 B2 | 11/2005 | Bertness |
| 7,003,410 B2 | 2/2006 | Bertness et al. |
| 7,003,411 B2 | 2/2006 | Bertness |
| 7,012,433 B2 | 3/2006 | Smith et al. |
| 7,015,674 B2 | 3/2006 | VonderHaar |
| 7,039,533 B2 | 5/2006 | Bertness et al. |
| 7,058,525 B2 | 6/2006 | Bertness et al. |
| 7,081,755 B2 | 7/2006 | Klang et al. |
| 7,106,070 B2 | 9/2006 | Bertness et al. |
| 7,116,109 B2 | 10/2006 | Klang |
| 7,129,822 B2 | 10/2006 | Finan et al. |
| 7,132,833 B2 | 11/2006 | Layden et al. |
| 7,184,905 B2 | 2/2007 | Stefan |
| 7,198,510 B2 | 4/2007 | Bertness |
| 7,199,557 B2 | 4/2007 | Anbuky et al. |
| 7,208,914 B2 | 4/2007 | Klang |
| 7,218,078 B2 | 5/2007 | Gagnon et al. |
| 7,394,394 B2 | 7/2008 | Lockhart et al. |
| 7,474,228 B2 | 1/2009 | Lockhart et al. |
| 7,479,763 B2 | 1/2009 | Bertness |
| 7,505,856 B2 | 3/2009 | Restaino et al. |
| 7,545,146 B2 | 6/2009 | Klang et al. |
| 7,557,586 B2 | 7/2009 | Vonderhaar et al. |
| 7,576,517 B1 | 8/2009 | Cotton et al. |
| 7,576,518 B2 | 8/2009 | Sanders et al. |
| 7,619,417 B2 | 11/2009 | Klang |
| 7,768,238 B2 | 8/2010 | Cotton et al. |
| 7,774,151 B2 | 8/2010 | Bertness |
| 7,940,052 B2 | 5/2011 | Vonderhaar et al. |
| 7,970,585 B2 | 6/2011 | Van Sloun et al. |
| 8,040,110 B2 | 10/2011 | Al-Anbuky et al. |
| 8,131,486 B2 | 3/2012 | Leonard et al. |
| 8,154,297 B2 | 4/2012 | Mousavi et al. |
| 2003/0057918 A1 * | 3/2003 | Aoki ............... G01R 31/3624 320/136 |
| 2004/0199343 A1 * | 10/2004 | Cardinal ........... B60L 3/0046 702/63 |
| 2006/0176630 A1 | 8/2006 | Carlino et al. |
| 2008/0239775 A1 | 10/2008 | Oughton et al. |
| 2009/0173582 A1 | 7/2009 | Ogg |
| 2009/0228225 A1 | 9/2009 | Burgess |
| 2010/0253147 A1 | 10/2010 | Ogg |

(56) References Cited

U.S. PATENT DOCUMENTS

| | | | | |
|---|---|---|---|---|
| 2013/0113429 | A1* | 5/2013 | Kim | H02J 7/00 320/128 |
| 2013/0169236 | A1* | 7/2013 | Schaefer | H01M 10/0525 320/136 |
| 2014/0015488 | A1* | 1/2014 | Despesse | H01M 10/425 320/122 |

OTHER PUBLICATIONS

Automatic Battery Monitoring System (ABMS), L-3 Maritime Systems, located at http://www.l-3mps.com/maritimesystems/abms.asp, known at least as early as Dec. 1, 2010, 1 page.
BACS—Battery Analysis & Care System Data Sheet, Generex Systems Gmbh (date unknown) located at http://www.generex.de/generex/download/datasheets/Datasheet_BACS_C20_en.pdf, last visited on Oct. 19, 2015, 17 pages.
Battery Management System (BMS), International Battery, Inc., Allentown, PA, 2010, 1 page.
BDS/Pro Battery Monitoring Brochure, Eagle Eye Power Solutions, located at http://eepowersolutions.com/products/battery-monitoring/ipqms, known at least as early as Dec. 1, 2010, 5 pages.
BDS/Pro Installation Instructions, Eagle Eye Power Solutions, known at least as early as Jan. 1, 2011, 14 pages.
BDS-40 Battery Diagnostic System Brochure, Alber (date unknown) located at http://www.alber.com/BrochuresPDF/BDS40_Brochure_Final_Web.pdf, 2 pages, last visited on Oct. 19, 2015.
BDS-40 Monitor Product Description guide, Alber (date unknown) located at http://www.alber.com/Docs/4200_063PDG_BDS40.pdf, 26 pages, last visited on Oct. 19, 2015.
Brown, "Battery Power—Solutions for OEM Design Engineers, Integrators & Specifiers of Power Management Products," Battery Power Magazine, Sep./Oct. 2011, 2 pages.
BTM Global Battery Monitor Brochure, Polytronics Engineering Ltd., known at least as early as Jan. 1, 2011, 16 pages.
BTM Global Monitoring Controller Brochure, Polytronics Engineering Ltd., known at least as early as Jan. 1, 2011, 2 pages.
BTM Global System Controller User Manual, Polytronics Engineering Ltd., 2010, 16 pages.
CellGuard System Product Brochure, Midtronics, Willowbrook, IL, 2007, 4 pages.
CellQ Battery Monitoring Remote Access Controller Data Sheet, BTECH, Inc. , Rockaway NJ, date unknown, 1 page.
CellSPY Monitoring System Architecture Brochure and Data Sheet, EMSYS Design, Inc., (date unknown) located at http://emsys-design.com/monitoringSystem.html, known at least as early as Dec. 6, 2013, 9 pages.
Cellwatch Battery Monitoring Systems Brochure, NDSL, Inc., known at least as early as Jan. 1, 2011, 8 pages.
EM1 Voltage, Temperature, and Impedance Module Data Sheet, BTECH, Inc. , Rockaway NJ, date unknown, 1 page.
FirstLine BMS Product Brochure, Stayco Energy Products, Dayton, OH, 2011, 4 pages.
How Cellwatch Works, NDSL, located at http:// www.cellwatch.com/about/how-cellwatch-works/, known at least as early as May 14, 2012.
LinkUPS Battery Test Remote Monitor Data Sheet, Ventev Innovations, known at least as early as Jan. 1, 2011, 2 pages.
PowerShield Configuration Software User Manual, PowerShield Limited, Auckland NZ, Oct. 2006, 68 pages.
PowerTrac SP Series Data Sheet, SBS Storage Battery Systems, Inc., known at least as early as Jan. 1, 2011, 2 pages.
S5 Battery Monitoring System BVM Battery Manager Software Data Sheet, BTECH, Inc. , Rockaway NJ, Feb. 2009, 2 pages.
S5 Battery Monitoring System UPS/VRLA Battery Cabinet Data Sheet, BTECH, Inc. , Rockaway NJ, Feb. 2009, 2 pages.
S-Box Data Sheet, LEM, (date unknown) located at http://www.lem.com/images/stories/files/Products/P1_7_5_sentinel/s_box.pdf, last visited on Oct. 19, 2015, 2 pages.
S-Bus Converter Data Sheet, LEM, (date unknown) located at http://www.lem.com/images/stories/files/Products/P1_7_5 sentinel/s_bus_converter.pdf, last visited on Oct. 19, 2015, 2 pages.
Sentinel Battery Management System Brochure, Encell Technology, Inc., known at least as early as Jan. 1, 2011, 4 pages.
Sentinel Battery Monitoring Product Brochure, PowerShield Limited (date unknown) located at http://www.pwrshield.com/files/resources/powershield-battery-monitoring.pdf, last visited on Oct. 19, 2015, 6 pages.
Sentinel Battery Monitoring Solution Data Sheet, LEM, (date unknown) located at http://www.lem.com/images/stories/files/Products/P1_7_5_sentinel/CH29103.pdf, last visited on Oct. 19, 2015, 2 pages.
Sentinel Intelligent Battery Transducer Data Sheet, LEM, known at least as early as Jan. 1, 2011, 3 pages.
SPM-200 Site Power Monitor Brochure, Newar, known at least as early as Jan. 1, 2011, 4 pages.
Two-Minute Guide to eNotify, Eaton Corporation, Jan. 20, 2006, 1 page.

* cited by examiner

200

```
┌─────────────────────────────────────────┐
│ MEASURE A VOLTAGE AND TEMPERATURE OF EACH│
│     JAR USING EACH BATTERY MONITOR      │
│                  210                     │
└─────────────────────────────────────────┘
                    ↓
┌─────────────────────────────────────────┐
│  DETERMINE A TARGET VOLTAGE ACCORDING TO THE │
│         MEASURED TEMPERATURE            │
│                  220                     │
└─────────────────────────────────────────┘
                    ↓
┌─────────────────────────────────────────┐
│ COMPARE THE MEASURED VOLTAGE AND THE TARGET │
│   VOLTAGE TO DETERMINE CHARGING CURRENT │
│                  230                     │
└─────────────────────────────────────────┘
                    ↓
┌─────────────────────────────────────────┐
│ CONTROLLING THE CHARGING CURRENT SUPPLIED TO │
│ EACH JAR USING THE BYPASS CIRCUIT TO MAINTAIN,│
│    INCREASE, OR DECREASE JAR VOLTAGE    │
│                  240                     │
└─────────────────────────────────────────┘
```

```
┌─────────────────────────────────────────────┐
│  MEASURE A VOLTAGE AND TEMPERATURE OF EACH  │
│   JAR IN A STRING OF JARS USING EACH BATTERY│
│                   MONITOR                   │
│                     310                     │
└─────────────────────────────────────────────┘
                      │
                      ▼
┌─────────────────────────────────────────────┐
│   DETERMINE A TARGET VOLTAGE ACCORDING TO THE│
│  MEASURED TEMPERATURE AND DETERMINE A CHARGE│
│    CURRENT BASED ON THE TARGET VOLTAGE AND  │
│                MEASURED VOLTAGE             │
│                     320                     │
└─────────────────────────────────────────────┘
                      │
                      ▼
┌─────────────────────────────────────────────┐
│   REDUCE THE CHARGE CURRENT USING THE BYPASS│
│   CIRCUIT TO REDUCE THE TEMPERATURE OF THE JAR│
│   OR INCREASE THE CHARGE CURRENT TO PROVIDE │
│                MAXIMUM CAPACITY             │
│                     330                     │
└─────────────────────────────────────────────┘
```

FIG. 3

APPARATUS, SYSTEM AND METHOD FOR CHARGE BALANCING OF INDIVIDUAL BATTERIES IN A STRING OF BATTERIES USING BATTERY VOLTAGE AND TEMPERATURE, AND DETECTING AND PREVENTING THERMAL RUNAWAY

CROSS-REFERENCE TO RELATED APPLICATION

The present non-provisional utility application claims priority under 35 U.S.C. §119 to provisional application 61/829,170 entitled APPARATUS, SYSTEM AND METHOD FOR CHARGE BALANCING OF INDIVIDUAL JARS IN A STRING USING JAR VOLTAGE AND TEMPERATURE, filed on May 30, 2013, and provisional application 61/894,253 entitled APPARATUS, SYSTEM AND METHOD FOR CHARGE BALANCING OF INDIVIDUAL JARS IN A STRING USING JAR VOLTAGE AND TEMPERATURE, AND DETECTING AND PREVENTING THERMAL RUNAWAY, filed on Oct. 22, 2013, which are hereby incorporated by reference herein.

TECHNICAL FIELD

Aspects of the present disclosure generally relate to systems and methods related to charging batteries. More specifically, the present disclosure relates to a system that uses the temperature of individual jars to determine the appropriate float voltage of the jar and charges and balances the jars accordingly.

BACKGROUND

Battery chargers put energy into batteries by forcing electric current through the battery. Typically, battery voltage is monitored to assess the state of charge. In such a system, some nominal battery voltage is associated with 100% or "full" state of charge. Hence, when a charger is connected to a battery, the charger compares the voltage of the battery to the nominal voltage and supplies a charge current to raise the battery voltage until the battery voltage meets the nominal voltage. In the case of a battery having multiple cells, also referred to as "jars," the total voltage of the battery is measured and individual jar voltages are not. Moreover, battery charge, measured voltage, and other factors are affected by temperature, and many chargers do not account for or adequately compensate for temperature issues.

It is with these concerns in mind, among others, that aspects of the present disclosure were conceived.

SUMMARY

According to one aspect, a system is provided that includes a controller and battery monitors for controlling the charging of jars. Specifically, the battery monitors detect the voltage and temperature of each jar in a string of jars. The battery monitors also include a bypass circuit capable of shunting a current around each jar. Using the temperature of each jar, a target voltage is selected. The system determines a charging current to provide to the string of jars, and controls the bypass circuits to provide the desired current to each jar for achieving the target voltage.

The system also monitors the battery temperature to ensure that the jars do not exceed a temperature threshold and to ensure that thermal runaway does not occur. If a jar's temperature exceeds a threshold, the system will shunt charging current around the jar and around neighboring jars in order to allow for the jar to cool. The system may also create an alert when thermal runaway is occurring, to notify a technician of the event.

The system also measures the charging performance of each jar. Charging metrics are stored in a local memory or sent to a remote computer. The metrics are later analyzed to spot jars that are not holding a charge as well as newer jars and that require extra current when charging. Repeated bad charging performance results in an alert being generated and a technician being notified of the need to replace a jar.

BRIEF DESCRIPTIONS OF THE DRAWINGS

Aspects of the present disclosure may be better understood and its numerous objects, features, and advantages made apparent to those skilled in the art by referencing the accompanying drawings. It should be understood that these drawings depict only typical embodiments of the present disclosure and, therefore, are not to be considered limiting in scope.

FIG. 2 illustrates an example method of charge balancing of individual jars.

FIG. 3 illustrates an example method of detecting and preventing thermal runaway of a jar in a string of jars.

DETAILED DESCRIPTION

Figure 1:
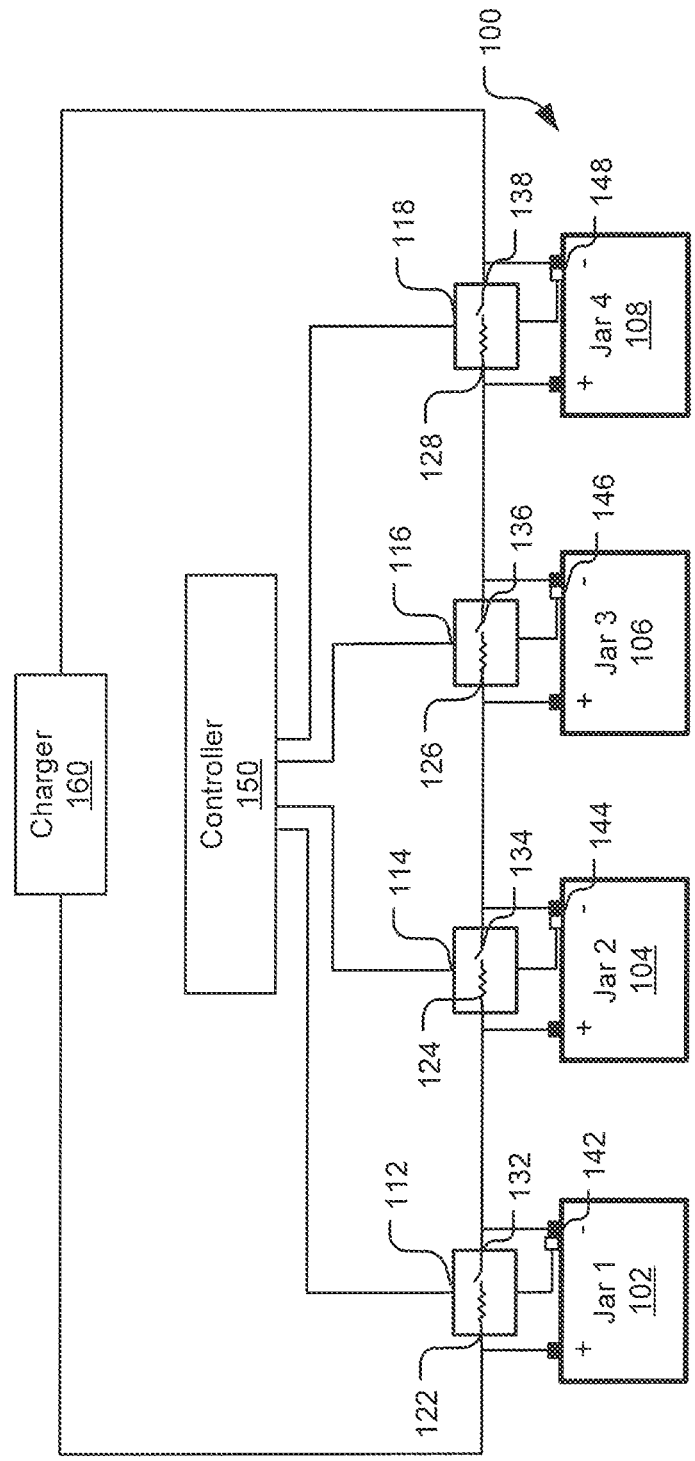
FIG. 1 illustrates an example system for charge balancing of individual jars and preventing thermal runaway.

Aspects of the present disclosure involve an apparatus and system for monitoring the float voltage of individual jars in a battery string, and also monitoring the temperature of the individual jars in the battery string. By monitoring the individual float voltages and temperatures, the system set out herein, may maintain each jar in the string at the nominal float voltage for the actual temperature of each jar. Although float voltages are used in the examples given (typically constant voltage), the same control technique can be used with any target voltage value, such as absorption, equalization, or float voltages. It could also be used to modify a constant current charge, by reducing the charge current to certain jars.

A jar, often referred to colloquially as a "battery," involves one or more cells that store energy. For purposes of this discussion, a battery is a collection of jars. In any event, a jar's environment is linked closely by voltage and temperature. A jar is conventionally constructed to have a nominal float voltage at a certain temperature when it is fully charged, and typically jars of the same type from a given manufacturer will all have substantially the same nominal float voltage. Similarly, the recommended float voltage will vary relatively predictably depending on the temperature of the jar. Correctly set, float voltages ensure batteries are kept at full charge capacity, and minimize battery deterioration. Having the charge voltage adjusted for the temperature, according to the manufacturers specification, allows for full capacity charging of colder jars and protects the warmer jars from being overcharged, thereby extending the life of the jars and the entire battery string and ensuring maximum capacity is obtainable from the battery string when required.

Typically lead acid jars are added together in a string (i.e., a battery) to produce higher voltages. It has been generally accepted that a charger is set at an accumulated voltage based on selecting the manufacturer's float voltage and multiplying this by the number of jars. Usually this manufacture's float voltage is calculated at an average or ambient temperature. The battery voltages are usually specified to the open circuit voltage of the battery. So a 12 V battery is generally about 12 V when fully charged, but not connected to the charger. The float voltage to maintain full charge is higher than 12 V, however, it could be about 2.25 V at 20° C. per 2 V cell. So a 12 V battery would have a float voltage of 13.5 V at 20° C.

This simplified method has been used for years, chargers will commonly equalize on constant current and then switch to a fixed float voltage which may be temperature compensated for an overall average ambient temperature. However, this conventional approach is not ideal for several reasons. Firstly, although the ends of a string of jars are set to the recommended float voltage (e.g., 54 volts for a string of 4, 13.5 V jars), the voltages on each individual jar are left to float free. This means that some voltages will go above the recommended float voltage and with the nature of the charger being constant voltage; this automatically means that other jars will not be held up to the required float voltage. Stated differently, while the string may be maintained at 54 volts, each individual jar may be more or less than 13.5 volts, and the float voltage is not compensated for temperature.

In both cases, having too high or too low of a float voltage may degrade the jars, especially over the long term. Jars held higher than the specified float voltage will be ultimately prone to drying out, especially with valve-regulated lead-acid (VRLA) jars. This drying out is the most common mode of failure of VRLA batteries and having an elevated float voltage is the principle cause of drying out. At the other end of the scale are the jars that do not get sufficient charge and at best these suffer from having insufficient charge, affecting string performance and at worst can gradually sulfate over time.

While all this is happening on a normal string over time the float voltage will be held only to an average voltage and will not be compensated for differences in temperature for individual jars but at best will be compensated for an average temperature, which again, varies the required voltage of the jar as typically a cooler jar will require a higher float voltage and a warmer jar will require less voltage to maintain its charge capacity.

However, besides the problems reflected above, the present inventors have also recognized that, apart from wide voltage variations in the same string, a wide variation in battery temperature can exist amongst the jars in a string, and with the increasing popularity of battery cabinets this temperature differential within a string is even more pronounced, as airflow is typically further restricted thereby cooling different jars at different rates within the string.

In addition, for any number of reasons, jars can overheat which may lead to various problems including thermal problems. For instance, when jars are placed in battery cabinets and surrounded by other jars, heat may not dissipate well from some of the jars particularly where air flow or ventilation is restricted. As the heat rises within a cell, its voltage may drop, which may in turn cause current being supplied to the jar to increase. In such a scenario, the increase in current may cause further temperature increases and resultant problems.

More specifically, FIG. 1 illustrates an example battery string 100 including four 12 volt (V) lead acid jars 102-108 connected in series to form a 54 V nominal battery connected to a charger 160. In this example, each jar 102-108 has a nominal float voltage of 13.5 V specified for some particular temperature X (e.g., 20 C). While 12 V nominal jars in a string of four jars is discussed herein, this is but one example meant to illustrated the inventive concepts of the present disclosure, and the disclosure is applicable to other jar types and different possible nominal float voltages. Each jar includes a battery monitor 112-118 configured to measure the voltage of the jar 102-108 and may also measure the temperature of each jar 102-108. Each of the monitors may also provide battery metrics including each jar's temperature and voltage to a controller 150.

In the example monitor set out herein, a variable amount of charge current can be made to bypass a jar 102-108 via the battery monitor 112-118. The variable amount of current can be controlled via a number of means with an adjustable current sink, adjustable bypass, or adjustable load. A few examples include using a resistor 122-128 and switch 132-138 controlled via PWM or changing duty cycle; a variable load such as a FET controlled via an adjustable voltage; or an LED with either its duty cycle or intensity controlled. In one example, the controller 150 is configured to adjust the current passing through a bypass circuit. For example, the controller 150 includes a PWM for each of the battery monitors 112-118 and regulates the bypass current using the PWM. The controller 150 is also configured to communicate measurements made by the battery monitors to a server 170 using a network 180.

The battery monitors 112-118 also measure the battery temperature through a sensor 142-148 coupled with a negative post or conductor coupled with the negative post of each jar 102-108. Thus, each battery monitor 112-118 is able to measure the voltage of each jar, able to control the amount of charge current to each jar (as well as the amount of current bypassing the jar through the monitor), and monitor the temperature at the negative post of the jar. Also because of the nature of a constant voltage charger, the devices working in union are able to increase the charge to an individual or string of jars.

One possible battery monitor that may be used in some aspects of this disclosure is detailed in U.S. Pat. No. 6,885,307, which is hereby incorporated by reference herein.

Referring to FIG. 2, a method of charging the jar string 100 is shown. With the continued reference to FIG. 1, the float voltage of each jar 102-108 may be maintained according to the actual temperature of the jar. The charger 160 is connected to the jar string 100, and an initial charging current is provided to the jar string 100. In one example, the charge balancing begins with a 0.5 amp (A) current to the jar string 100. Each of the battery monitors 112-118 measure both the voltage and temperature of each of the jars 102-108 and send the measurements to the controller 150 (operation 210). In this example, Jar1 (102) is at 13.5 V and a temperature of 20° C., Jar2 (104) is at 14 V and a temperature of 20° C., Jar3 (106) is at 13 V and a temperature of 20° C., and Jar4 (108) is at 13.5 V and a temperature of 23° C. The target voltage for each of the jars is then determined for the temperature of each jar by the controller 150 (operation 220).

The controller 150 compares the measured voltages with the target voltages for the temperatures of each jar (operation 230). Each the first three jars 102-106 are at the nominal temperature of 20° C. At 20° C. the nominal float voltage for a jar is 13.5 V. The target float voltage for each Jar at 20° C.

is therefore 13.5 V. Jar1 is at the nominal float voltage, Jar2 is 0.5 V above the target float voltage, and Jar3 is 0.5 V below the target float voltage. Jar4 has a temperature that is 3° C. over the nominal temperature. In this example, when a jar that has a temperature of 3° C. over the nominal temperature, the target float voltage is 13 V. Jar4 therefore is 0.5 V above its target float voltage.

The charger 160 provides the jar string 100 with a charging current and the bypass circuits are utilized to adjust or maintain the jar voltages (operation 240). Continuing the above example, the voltage of Jar2 needs to be lowered and the voltages of Jar3 and Jar4 need to be raised. The charger 160 provides a constant voltage-controlled trickle charge Ic1 of 0.5 A to Jar1 to maintain the first Jar at its nominal float voltage. With respect to the second jar, however, the trickle charge Ic2 is reduced from 0.5 A to a lower value, such as 0.25 A. In order to achieve this, 0.25 A are bypassed through bypass circuit of the second battery monitor 114 attached to Jar2. With respect to Jar3, however, the current needs to be increased above 0.5 A, such as to 1 A. With a trickle charge set to 0.5 A, the trickle charge is increased to 1.0 A, and 0.5 A is bypassed through the first monitor 112 so that Ic1 is maintained at 0.5 A, and 0.75 A is bypassed through the second monitor 114 so that Ic2 is maintained at 0.25 A. With respect to Jar3, the battery monitor 116 is opened so that no appreciable current bypasses Jar3 and the entire 1 amp charge current flows to the jar.

Jar4 is at 23° C., which is 3° C. above nominal. Since lead acid batteries have an inverse relationship between voltage and temperature, meaning the recommended float voltage should be higher at a lower temperature and lower at a higher temperature, the measured voltage of 13.5 V at 23° C. is higher than its nominal float voltage at 23° C. With respect to jar4, the battery monitor 118 is set to bypass all or substantial portion of the charge current and so that nearly the entire 1 amp charge current is diverted around the jar. When the charger is a constant voltage charger, it is possible to alter the loads on other jars to change the float voltage on a particular target jar.

By using one monitoring device 112-118 per jar 102-108 along with temperature sensing taken directly from the negative post of the jar or elsewhere, the system is able to maintain the float voltage with individual temperature compensation applied for each jar to ensure that the float charge voltage is within the manufacturer's specified parameters at all times and at all temperatures. This helps to ensure the maximum capacity from a string of jars and also extends the life of the jars by preventing over or under charging over time even within the same string inside the same cabinet.

Besides capacity balancing the jars using a combination of voltage and temperature as factors, the system also may include memory and/or communications device for transmitting charge balancing metrics to a remote computer 170 for storage using the network 180, such as the Internet or a local area connection. With such capacity balancing metric storage, the system can identify bad jars in need of replacement. For example, if one particular jar is trending over a nominal temperature, is unable to maintain a nominal charge voltage, and is not improving with some number of charge balancing attempts (e.g., 6), then an alert may be generated that the jar is due for replacement. In one example, the balancing metrics are transmitted to a remote computer 170 that stores the values and provides access to the values through a graphical user interface. The remote computer 170 may also generate a replacement alert or message of some sort. Alternatively, the battery monitor may include a routine that records the charge balancing metrics and compares them against some threshold or thresholds, and generates an alert (visual, audible or message) that notifies a technician that the jar is need of replacement.

A particular jar's health and charge capacity can also be inferred by the change in the amount of charge current required to maintain the target voltage over time. As the battery ages, it will require larger amounts of current to maintain its charge. Once a battery reaches a limit it should be replaced as it is nearing the end of its useful life. It is also possible by observing the trend of the change in charge rate to predict when the battery will need to be replaced. The charging current a jar is using can be calculated by subtracting the full battery string charge current from that particular jar's battery monitor bypass current.

Additionally, the system may also be configured to fully form the plates of each jar. Often, the plates of a jar are not fully formed when the jar is put into use. Without fully formed plates, however, the full capacity of the jar may not be reached and the nominal float voltage may be different than specified. Moreover, in a string of jars, the capacity and float voltage of each jar may differ, which may lead to difficulties or complications in load balancing, capacity maintenance and the like. Fully forming the plates typically requires putting some specified charge current to the battery and that specified charge current is often higher than a trickle charge current or a normal charge current.

The present system may be configured to provide plate formation completion to an assembled string of batteries by establishing a boost charge to the string and in parallel, sequentially, or in some other order, turning off the load (opening the bypass through the battery monitor) and applying the boost charge to each jar in the string while at the same time turning on or allowing a bypass of some or all of the boost charge to the other jars. This process may be performed for each jar for some specified period of time (per jar) or until some float voltage is reached for each jar. In one example, the process is performed on full or nearly fully charged jars. Following the application of the boost charge to each jar, the jars may be load balanced to each jars nominal float voltage at its actual temperature according to the method set out above.

Aspects of the present disclosure also involve an apparatus and system for monitoring the voltage and temperature of individual jars in a battery string, and detecting conditions that may present a risk for thermal runaway of a jar or battery. By monitoring the individual voltages and temperatures, the system set out herein, may shunt current from a jar using the bypass circuit of the battery monitor when the jar is inappropriately elevated in temperature and potentially drawing current that would further elevate the temperature. The system can shunt current until the temperature rise discontinues or may bypass the jar completely if temperature is exceeding some threshold or rising too quickly.

Referring to FIG. 3, a method of shunting current from an overheating jar is depicted. In one specific example, the system operates with a threshold, or sequence of thresholds, with one such threshold being about 34° C. With some types of jars, a temperature of 34° C. is a critical threshold. When the jar meets or exceeds this temperature, it may begin heating uncontrollably as the jar can no longer dissipate sufficient heat at that temperature. By this point, the voltage has also dropped significantly, and current into the battery has risen and is contributing to the inability of the jar to dissipate heat sufficiently. Hence, the jar enters in a state of thermal runaway.

The present system can avoid, or substantially reduce the risk, of thermal runaway by monitoring temperature and/or voltage, and shunting current from the jar when certain thresholds are met, whether temperature, voltage, or a combination thereof. For example, the battery monitors 112-118 measure the voltage and temperature of each jar in the string of jars (operation 310). The measured temperature is then compared to one or more temperature thresholds (operation 320). Current is then shunted when the jar exceeds the temperature threshold (operation 330). For example, if a jar reaches a temperature of 31° C., then the system may shunt a first amount of charge current from the jar using the current bypass circuit in a battery monitor. If the jar reaches 32° C., then the system will shunt a greater amount of charge current form the jar.

In another example, the system also monitors the voltage of each jar and compares the voltage to one or more voltage thresholds. If the voltage of a jar exceeds a nominal voltage, such as 13.8 volts, then the system will shunt charge current from that jar. If the voltage rose in conjunction with temperature, then the system would shunt additional current from the jar. The system would maintain a current shunt until voltage started to rise and/or temperature started to decrease. If a jar were to reach a temperature of 33° C., the system may direct all current around the jar. Stated differently, at some critical temperature, below the runaway temperature, the system may shunt a maximum charge current (in some cases all of the current) away from the jar in an effort to keep the jar from reaching the runaway temperature. In yet another alternative, the battery monitoring device coupled with the jar may include a contact on the charge line that opens under control and isolates the jar from the string to eliminate all charge current from the jar.

The voltages and temperatures discussed above are merely examples meant to illustrate the overall functionality. For any particular type of jar, battery, cabinet type (including cooling functionality) and other factors, the system may rely on a table of factors to consider in controlling current to the jars in order to thermally manage the jars. The table may include trickle charge, voltage and temperature value sets, and shunt control for each set. It is possible that active capacity balancing aspects to the system may work in concert with the thermal runaway prevention. Stated differently, factors discussed above may be used to both control charge current for purposes of charging as well as for purposes of thermal management.

Should the temperature continue to rise, such as when the warming jar is surrounded by jars and is not dissipating heat well, then the system may shunt charge current away from adjacent jars in an effort to allow adjacent jars to cool thereby allowing the jar of concern to dissipate heat more rapidly or effectively.

Besides controlling the charge current (or shunt current) to a jar or jars in order to thermally manage a jar or jars, and avoid heat related problems, such as thermal runaway, the system is also configured to generate and transmit an alert to a remote computer. Certain actions, such as shunting charge current, may or may not be fully automatic and may be controlled from the remote computer 170. For example, before completely commanding a charger to stop supplying current to a string, it may be prudent to verify that the jar is overheating and there is not a malfunctioning battery monitor or temperature probe. Hence, the system may incorporate a delay before issuing an off command to the charger, or may require some form of verification prior to such an action. In addition to generating an alert, the system may also illuminate or otherwise activate a visible or audible alarm meant to notify a technician of a possible thermal event.

Hence, with aspects of the described system, it is possible to identify events that may be associated with thermal runaway, and to alert or automatically take various actions to slow, mitigate or prevent thermal runaway or other thermal issues.

Figure 4:
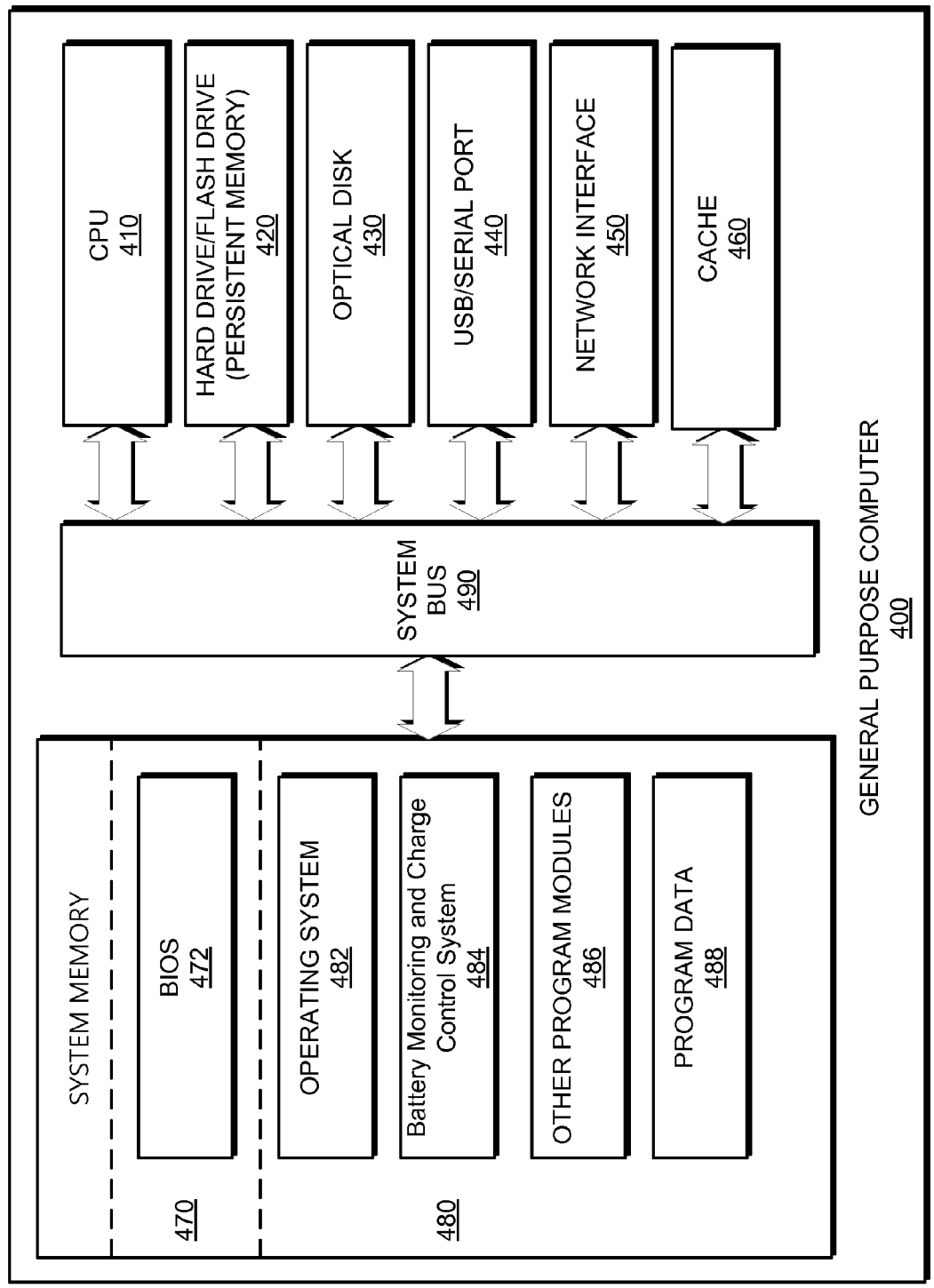
FIG. 4 illustrates an example general purpose computing device that may be used in the implementation of the system for charge balancing of individual jars and preventing thermal runaway.

The controller 150 may be implemented using a variety of general purpose computing devices. For example, a microcontroller, single board computer (SBC), or similar small form computing device may be used. Likewise, the remote computer or server 170 may also be a general purpose computing device. FIG. 4 illustrates an example general purpose computing device 400 that may be useful in implementing the described technology. It should be understood that in various embodiments, the general purpose computing device 400 may omit various described parts while including substitutions.

The example hardware and operating environment of FIG. 4 for implementing the described technology includes a general purpose computing device, such as microcontroller, single-board computer, personal computer, server, or other type of computing device. In the implementation of FIG. 4, for example, the general purpose computer 400 includes a processor 410, a cache 460, a system memory 470, 480, and a system bus 490 that operatively couples various system components including the cache 460 and the system memory 470, 480 to the processor 410. There may be only one or there may be more than one processor 410, such that the processor of general purpose computer 400 comprises a single central processing unit (CPU), or a plurality of processing units, commonly referred to as a parallel processing environment. The general purpose computer 400 may be any type of computer; the invention is not so limited.

The system bus 490 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 470 and random access memory (RAM) 480. A basic input/output system (BIOS) 472, containing the basic routines that help to transfer information between elements within the general purpose computer 400 such as during start-up, is stored in ROM 470. The general purpose computer 400 further includes a persistent memory 420 such as a hard disk drive or solid state drive for storing operating instructions and the above discussed charging metrics. The general purpose computer may also include an optical disk drive 430 for reading from or writing to a removable optical disk such as a CD ROM, DVD, or other optical media.

The persistent memory 420 and optical disk drive 430 are connected to the system bus 490. The drives and their associated computer-readable media provide nonvolatile storage of computer-readable instructions, data structures, program engines and other data for the general purpose computer 400. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program engines may be stored on the hard disk, optical disk, ROM 470, or RAM 480, including an operating system 482, a battery monitoring and charging control application 484, and one or more application programs 486. A user may enter commands and information into the general purpose computer 400 through input devices such as a keyboard and pointing device connected to the USB or Serial Port 440. These and other input devices are often connected to the processor 410 through the USB or serial port interface 440 that is coupled to the system bus 490, but may be connected by other interfaces, such as a parallel port. A monitor or other type of display device may also be connected to the system bus 490 via an interface, such as a video adapter 460. In addition to the monitor, computers typically include other peripheral output devices (not shown), such as speakers and printers.

The general purpose computer 400 may operate in a networked environment using logical connections to one or more remote computers. These logical connections are achieved by a network interface 450 coupled to or a part of the general purpose computer 400. The invention is not limited to a particular type of communications device. The remote computer may be another computer, a server, a router, a network PC, a client, a peer device, or other common network node, and typically includes many or all of the elements described above relative to the general purpose computer 400. The logical connections include a local-area network (LAN) a wide-area network (WAN), or any other network. Such networking environments are commonplace in office networks, enterprise-wide computer networks, intranets and the Internet, which are all types of networks.

The network adapter 450, which may be internal or external, is connected to the system bus 450. In a networked environment, programs depicted relative to the general purpose computer 400, or portions thereof, may be stored in the remote memory storage device. It is appreciated that the network connections shown are example and other means of and communications devices for establishing a communications link between the computers may be used.

The embodiments of the system described herein are implemented as logical steps in one or more computer systems including a controller and a remote computer. The logical operations of the present invention are implemented (1) as a sequence of processor-implemented steps executing in one or more computer systems and (2) as interconnected machine or circuit engines within one or more computer systems. The implementation is a matter of choice, dependent on the performance requirements of the computer system implementing the system. Accordingly, the logical operations making up the embodiments of the system described herein are referred to variously as operations, steps, objects, or engines. Furthermore, it should be understood that logical operations may be performed in any order, unless explicitly claimed otherwise or a specific order is inherently necessitated by the claim language.

The foregoing merely illustrates the principles of the battery charging and balancing system. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

The invention claimed is:

1. A method of load balancing comprising:
    measuring a first voltage and a first temperature of a first battery in a string of batteries;
    measuring a second voltage and a second temperature of a second battery in the string of batteries;
    setting a first target voltage based on a first nominal battery voltage associated with the first temperature;
    setting a second target voltage based on a second nominal battery voltage associated with the second temperature;
    controlling a first current to the first battery to:
        maintain the first voltage when the first voltage is at the first target voltage;
        increase the first voltage when the first voltage is below the first target voltage; and
        decrease the first voltage when the first voltage is above the first target voltage; and
    controlling a second current to the second battery to:
        maintain the second voltage when the second voltage is at the second target voltage;
        increase the second voltage when the second voltage is below the second target voltage; and
        decrease the second voltage when the second voltage is above the second target voltage.

2. The method of claim 1, wherein controlling the first current to the first battery comprises controlling a current bypass circuit operably coupled to the first battery, wherein the current bypass circuit receives a bypass current being supplied to charge the string of batteries and routes a third current to bypass the first battery with a remainder of the bypass current being supplied to the first battery as the first current.

3. The method of claim 1, wherein the controlling of the first current to the first battery further comprises:
    reducing the first current when the first temperature exceeds a first temperature threshold indicative of thermal runaway, disregarding the first target voltage, and thereby reducing the first temperature.

4. The method of claim 3, wherein the controlling of the second current to the second battery further comprises:
    reducing the second current being provided to the second battery in the string of batteries when the first temperature exceeds the first temperature threshold, disregarding the second target voltage, thereby reducing the second temperature of the second battery.

5. The method of claim 3, further comprising generating an alert when the first temperature meets the first temperature threshold indicative of thermal runaway.

6. The method of claim 1, further comprising determining whether the first battery is malfunctioning by:
    storing the first temperature and first voltage in a memory; and
    generating an alert indicating that the first battery is near failure when at least one of:
        the first temperature of the first battery has a temperature exceeding a first temperature threshold;
        the first current exceeds a current threshold; and
        the first voltage is less than a third voltage indicative of the first battery malfunctioning.

7. The method of claim 1, further comprising sending the first temperature and the first voltage to a remote computing device.

8. The method of claim 2, further comprising calculating the first current by subtracting the bypass current from the third current being supplied to the string of batteries and sending a value of the first current to a remote computing device.

9. A load balancing system comprising:
a first battery monitor operably coupled to a first battery in a string of batteries the first battery monitor recording a first voltage and a first temperature of the first battery;
a second battery monitor operably coupled to a second battery in the string of batteries, the second battery monitor recording a second voltage and a second temperature of the second battery;
a controller configured to receive the first voltage and the first temperature from the first battery monitor, and further configured to receive the second voltage and the second temperature from the second battery monitor, wherein the controller:
sets a first target voltage for the first battery based on a first nominal battery voltage associated with the first temperature;
sets a second target voltage for the second battery based on a second nominal battery voltage associated with the second temperature;
controls a first current supplied to the first battery using a first bypass circuit to:
maintain the first voltage when the first voltage is at the first target voltage;
increase the first voltage when the first voltage is below the first target voltage; and
decrease the first voltage when the first voltage is above the first target voltage; and
controls a second current supplied to the second battery using a second bypass circuit to:
maintain the second voltage when the second voltage is at the second target voltage;
increase the second voltage when the second voltage is below the second target voltage; and
decrease the second voltage when the second voltage is above the first target voltage.

10. The load balancing system of claim 9, wherein the controller is further configured to determine a bypass current for charging the first battery and the second battery via a bypass circuit.

11. The load balancing system of claim 10, wherein a third current is routed through a first portion of the bypass circuit with a first remainder portion of the bypass current being supplied to the first battery; and
a fourth current is routed through a second portion of the bypass circuit with a second remainder portion of the bypass current being supplied to the second battery.

12. The load balancing system of claim 11, wherein the controller is configured to provide a pulse width modulated signal to the first portion of the bypass circuit to control the third current.

13. The load balancing system of claim 9, wherein the controller comprises a memory configured to store charge balancing metrics including each measured temperature and voltage and the controller is further configured to generate an alert when at least one of:

the first temperature exceeds a first temperature threshold;
the first current exceeds a current threshold; and
the first voltage is less than a third voltage indicative of the first battery malfunctioning.

14. The load balancing system of claim 9, wherein the controller further comprises a network interface configured to send the first temperature and the first voltage to a remote computing device.

15. The load balancing system of claim 9, wherein the controller is further configured to reduce the first current when the first temperature exceeds a first temperature threshold, disregarding the first target voltage and thereby reducing the first temperature.

16. The load balancing system of claim 15, wherein the controller is further configured to reduce the second current to the second battery when the first temperature exceeds the first temperature threshold.

17. A method of load balancing comprising:
measuring a first voltage and a first temperature of a first battery in a string of batteries;
setting a first target voltage based on a first nominal battery voltage associated with the first temperature;
obtaining a first current based on a difference between the first voltage and the first target voltage;
measuring a second voltage and a second temperature of a second battery in the string of batteries;
setting a second target voltage based on a second nominal battery voltage associated with the second temperature;
obtaining a second current based on a difference between the second voltage and the second target voltage;
obtaining a third current that is greater than or equal to a larger of the first current and the second current;
controlling the first current to maintain the first voltage when the first voltage is at the first target voltage, increase the first voltage when the first voltage is below the first target voltage, and decrease the first voltage when the first voltage is above the first target voltage by routing a first portion of the third current from the first battery using a first bypass circuit operably coupled to the first battery; and
controlling the second current to maintain the second voltage when the second voltage is at the second target voltage, increase the second voltage when the second voltage is below the second target voltage, and decrease the second voltage when the second voltage is above the second target voltage by routing a second portion of the third current from the second battery using a second bypass circuit operably coupled to the second battery.

18. The method of claim 17, further comprising reducing the first current when the first temperature exceeds a first temperature threshold thereby reducing the first temperature.

19. The method of claim 18, further comprising reducing the second current when the first temperature exceeds a second temperature threshold.

* * * * *